2,948,938

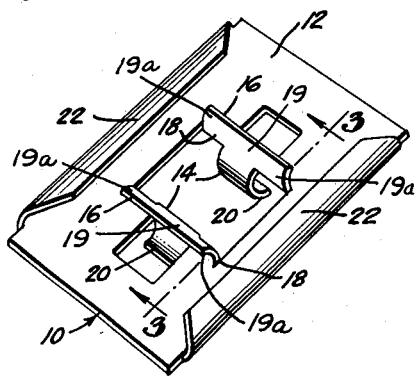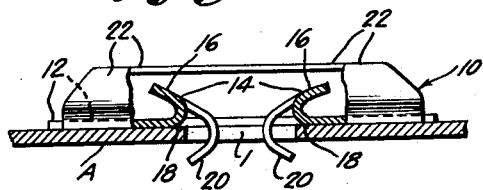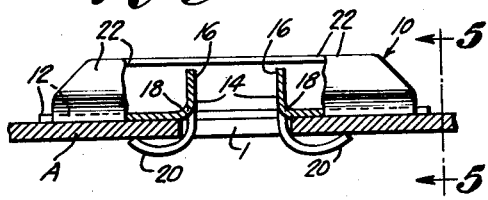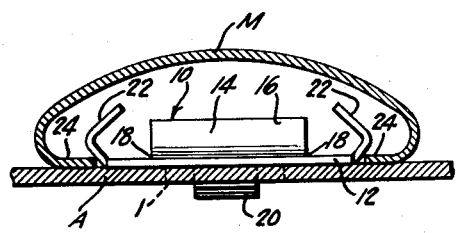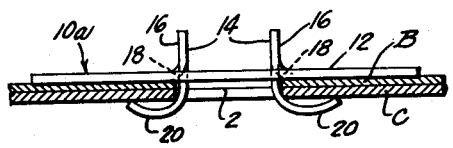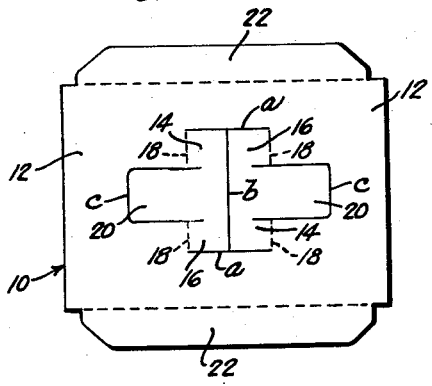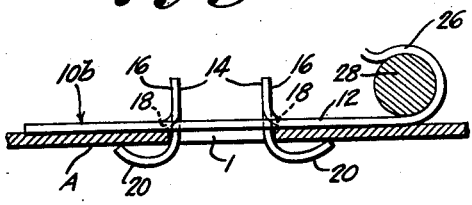
INVENTOR
ROBERT J. HOLTON
BY
ATTORNEY Aug. 16, 1960  R. J. HOLTON  2,948,938
CLIPS FOR MOLDINGS, CABLES AND THE LIKE
Filed Oct. 24, 1955  2 Sheets-Sheet 2
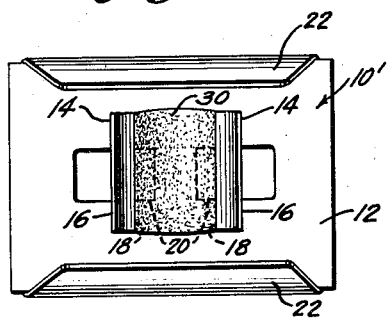
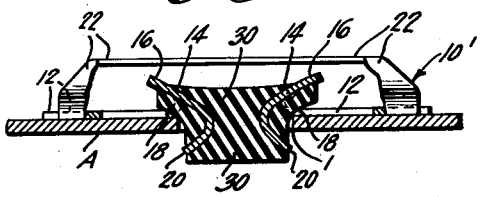
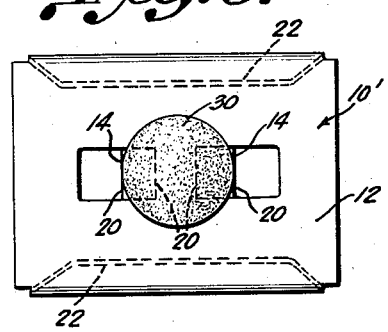
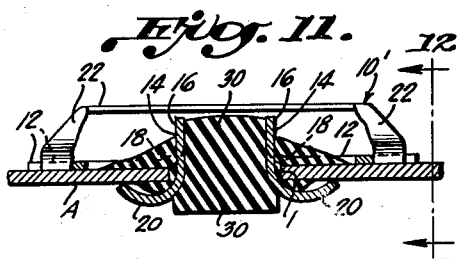
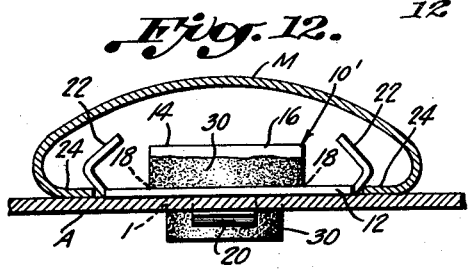
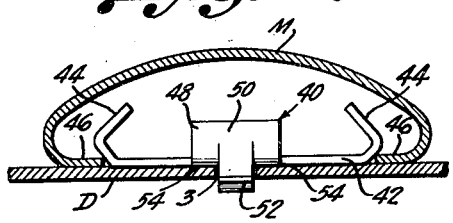
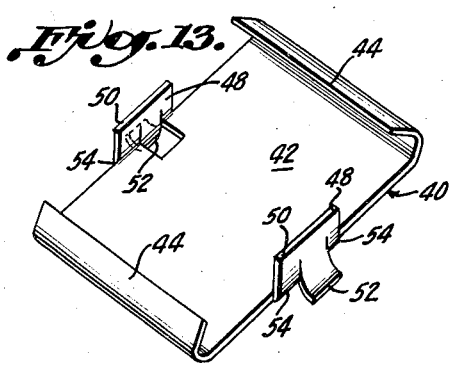
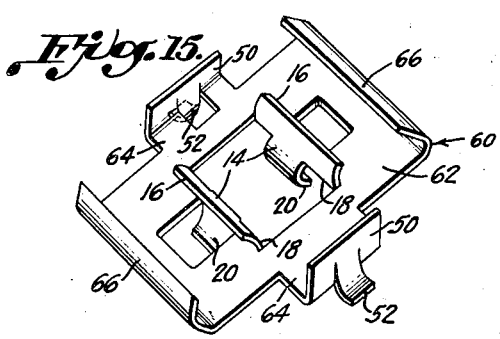
INVENTOR
ROBERT J. HOLTON
BY
H. J. Lombard
ATTORNEY United States Patent Office 2,948,938
Patented Aug. 16, 1960

CLIPS FOR MOLDINGS, CABLES AND THE LIKE

Robert J. Holton, Cleveland, Ohio, assignor to Tinnerman Products, Inc., Cleveland, Ohio, a corporation of Ohio Filed Oct. 24, 1955, Ser. No. 542,417

5 Claims. (Cl. 24—73)

This invention relates to clips or fasteners for mounting moldings, trim strips, cables and similar objects on a supporting part and deals, more particularly, with improvements in such clips or fasteners which are adapted to be positively secured in an opening in a supporting part by a simple operation taking place entirely from the outer or accessible side of the supporting part.

The various forms of clips or fasteners in accordance with the invention are of the general character which comprise a sheet metal body defining a head or base carrying a pair of cooperating shank elements that are receivable in a work opening and secured in fastening position in the work opening by expansion of said shank elements into locking relation with marginal portions of the work opening.

A primary object of the invention is to provide various forms of clips or fasteners of this character in an improved, highly simplified construction comprising a relatively small, inexpensive sheet metal body providing the head or base of the clip and a pair of cooperating shank elements projecting from the inner or under-surface thereof, with each shank element included in a movable arm having opposite free ends projecting from both the inner and outer surfaces of said base and bendably connected thereto between said opposite free ends thereof in an arrangement in which the inner free ends of said arms define a pair of cooperating shank elements adapted to be expanded into secured position in a work opening responsive to movement of the outer free ends of said arms.

A further object of the invention is to provide various forms of such a clip or fastener comprising a pair of movable arms which are stamped from the material of the base thereof in a manner whereby said movable arms have bendable connections to said base between opposite free ends thereof projecting from both the inner and outer surfaces of said base, with the inner free ends of said arms defining cooperating shank elements adapted to be spread apart or expanded to secured position in a work opening upon compression of the outer free ends of said arms toward each other.

Another object of the invention is to provide various forms of clips or fasteners of the kind described comprising a sheet metal body defining a base or head and a pair of cooperating shank elements embedded in a thermoplastic plug or the like, with each of said shank elements included in a movable arm provided with opposite free ends projecting from both the inner and outer surfaces of said base and bendably connected thereto between said opposite free ends thereof in a manner whereby the inner free ends of said arms define shank elements adapted to be spread apart or expanded in secured position in a work opening responsive to movement of the outer free ends of said arms, along with a simultaneous expansion of said plug to seal said work opening against the passage of water, dust and other foreign matter in said secured position of the clip or fastener.

Further objects and advantages, and other new and useful features in the construction, arrangement and general combination of elements and details of construction of the improved clips or fasteners of the invention, will be apparent as the following description proceeds with reference to the accompanying drawings, for purposes of illustration but not of limitation, in which like reference characters designate like parts throughout, and in which:

Fig. 1 is a perspective view of a fastener in accordance with the invention as seen from the upper or outer side of the head or base thereof, the fastener being provided in the form of a clip for attaching a molding or other channel-shaped object to a supporting part;

Fig. 2 shows in plan the outline of the sheet metal blank for providing the clip shown in Fig. 1;

Fig. 3 is a side view, partially in section, showing the clip of Fig. 1 as initially assembled in a panel opening preparatory to the operation for securing the clip in said panel opening;

Fig. 4 is a view similar to Fig. 3 showing the fastener as secured in the panel opening; and, Fig. 5 is a view of Fig. 4 along line 5—5 looking in the direction of the arrows, and shows the clip in end elevation as secured in the panel opening together with a molding, illustrated in section, attached in mounted position by retaining portions on the head or base of the clip.

Fig. 6 shows a fastener similar to that of Figs. 1–5, inclusive, as provided in the form of a simple clip which is readily anchored in a work opening in two or more superposed parts to be secured.

Fig. 7 shows a further form of clip or fastener in accordance with the invention as provided for retaining a cable, tube or similar object in mounted position on a supporting part.

Fig. 8 is a top plan view of the head or base of a molding clip similar to that of Figs. 1–5, inclusive, in which the spaced shank elements thereof are embedded in a plug made of plastic, or the like, which is secured in the work opening along with said shank elements to close the work opening against the passage of water, dust and foreign matter;

Fig. 9 is a bottom plan view of the clip or fastener in Fig. 8;

Fig. 10 is a side view, partially in section, showing the clip of Figs. 8 and 9 as initially assembled in a panel opening in readiness for the operation by which the clip is secured in said panel opening;

Fig. 11 is a view similar to Fig. 10 showing the clip as secured in the panel opening; and, Fig. 12 is a view of Fig. 11 along line 12—12 looking in the direction of the arrows, and shows this form of clip in end elevation as secured in the panel opening together with a molding, illustrated in section, attached in mounted position by retaining portions on the head or base of the clip.

Fig. 13 is a perspective view of another form of clip or fastener in accordance with the invention; and, Fig. 14 is a sectional view showing the clip of Fig. 13 as secured in a panel opening, and a molding attached in mounted position by retaining portions on the head or base of the clip.

Fig. 15 is a perspective view of a further form of clip or fastener in accordance with the invention.

Referring now, more particularly, to the drawings, Figs. 1–5, inclusive, disclose a preferred form of clip or fastener 10 in accordance with the invention which is applied and secured in a work opening 1 in a supporting part such as a panel A, as illustrated in Figs. 3 and 4, in position for mounting a molding M or similar object on the supporting part A, substantially as shown in Fig. 5.

The supporting part A is usually in the form of a plate or panel, or the like, and is provided with a series of spaced openings 1 for the required number of clips 10 to be secured thereto along the path which the molding M is to extend in mounted position. The panel A may be of any suitable metal, wood or fibre board material and the openings 1 therein may be round, rectangular or of any other suitable outline, but generally are provided in the manner of circular holes which involve the least cost inasmuch as only the simplest and cheapest punching or drilling tools are required.

The clip or fastener, 10, Figs. 1–5, inclusive, is a simple inexpensive article of manufacture which is readily constructed from any suitable malleable sheet metal such as cold rolled steel or malleable spring metal. Such "malleable" type metal possesses the characteristic that it may be permanently deformed upon predetermined application of force, as distinguished from a purely spring-type metal which when bent will return to its original position upon removal of the bending or distorting force. The clips may be formed from blanks of various outlines, of course, but from a quantity production standpoint, are most advantageously provided from a comparatively small, generally rectangular blank, such as shown in Fig. 2, which may be obtained from standard sheet metal strip stock with little loss or waste of material.

The sheet metal blank or body defines the head or base 12 of the clip or fastener 10 and is provided with a partially severed area preferably in the approximate center thereof, as shown in Fig. 2, forming a pair of movable arms 14 which have bendable or hinged connections to said base 12 intermediate the opposite free ends of each of said arms 14. To this end, the stamping arrangement shown in Fig. 2 is particularly advantageous in that it is highly simplified and may be easily provided in a relatively small area as is necessary for providing the clips or fasteners in small sizes. This simplified stamping arrangement requires merely a pair of spaced parallel slits a, Fig. 2, in normal relation to an intermediate slit b defining a pair of tabs 16 having free ends and bendable connections to said base 12 along bend lines 18. A substantially U-shaped cut c, Fig. 2, adjoining each tab 16 defines a tongue 20 having a free end extending in the opposite direction from the free end of the associated tab 16. Preferably the U-shaped cut c extends beyond the adjacent bend line 18 into the tab portion 16 which facilitates the forming of said tab 16 and allows the tongue 20 to be provided in an increased effective length in a minimum area.

The arrangement, accordingly, is such that each of the movable arms 14 comprises a tab 16 having a free end and bendably connected to the fastener base 12 along the bend lines 18 and carrying a tongue 20 having a free end extending in the opposite direction from the free end of said tab 16. When the arms 14 are bent about the bend lines 18, as shown in Figs. 1 and 3, the free ends of said tabs 16 project outwardly from the outer or upper surface of the fastener base 12 while the free ends of the tongues 20 project downwardly from the inner or undersurface of said fastener base 12. The arms 14 thus are united to the fastener base in bendable connections intermediate the lengths of said arms 14 and in a manner whereby the tongues or securing elements 20 at the undersurface of said base are movable outwardly from each other responsive to inward movement of the tabs 16 projecting from the upper surface of said base where they are readily accessible for securing the clip or fastener in a work opening by an operation taking place entirely from the outer side of an assembly. In the embodiment illustrated, each tab 16 comprises a central portion 19 spaced or separated from the base and lateral portions 19a which are bendably connected or hinged to the base.

Preferably the tabs 16 are provided in diverging relation substantially as shown in Fig. 3 with the tongues 20 carried thereby curved or directed inwardly and then outwardly to provide a pair of cooperating shank elements in the form of outwardly extending hooks, or the like, projecting from the undersurface of the fastener base 12 and adapted to be readily received in the work opening 1 in the panel A or other part in the initial step for securing the clip in said work opening 1.

The clip or fastener 10, otherwise, has the opposite sides or ends thereof bent to define a pair of resilient flanges or similar retaining portions 22 adapted for snap fastening engagement with the inturned flanges 24 on the molding M, as shown in Fig. 5, or for similar attachment with the inner walls of a hollow or channel-shaped object such as a trim strip, or the like.

The completed clip or fastener 10 appears substantially as shown in Fig. 1, and in securing the same to the panel or other support A, the clip is initially applied as shown in Fig. 3 to seat fastener base 12 on said panel A with the shank elements or hooks 20 easily and quickly received in the work opening 1 and having their free ends projecting beyond the underside of said panel A. The tabs 16 have the free ends thereof projecting from the outer side of the assembly and thus are readily accessible for quick and easy actuation by a suitable tool, such as a pair of pliers, to compress said tabs 16 inwardly toward each other from their initial diverging relation, Fig. 3, to substantially parallel relation as shown in Fig. 4. Such inward movement of the tabs 16 toward each other causes the arms 14, including the shank elements or hooks 20, to pivot about their bendable connections 18 to the base 12 in a manner whereby said hooks 20 are forced outwardly to overlap the adjacent edges of the work opening 1 with the free ends of said hooks 20 defining pronounced shoulders or abutments directed toward the underside of the panel A and positively engaging material portions of said panel A adjacent the work opening 1 to positively lock the clip or fastener in secured position in said work opening 1.

In the procedure for mounting the molding M, Fig. 5, on the panel A, as many clips or fasteners 10 as are necessary are similarly secured in work openings 1 prepared in said panel A in aligned relation along the path in which the molding M extends in the completed assembly. The molding M is positioned over the clips 10 with the inturned flanges 24 thereof in engagement with the upper surfaces of the flanges 22 on the clips. When downward pressure is exerted on the top of the molding M, the edges of the inturned flanges 24 on said molding M are sprung into attached position on the flanges 22 on the clips as shown in Fig. 5 to provide the completed mounting of said molding M on the panel or other supporting part A. This operation is in the nature of a snap fastening action which takes place as a result of the inherent resiliency of the inturned flanges 24 of the molding M and the inherent resiliency of the flanges 22 on the clips 10.

Fig. 6 discloses a clip or fastener 10a wherein the securing means is substantially identical in construction and application to that described with reference to Figs. 1–5, inclusive, and in which the head or base 12 of the clip is simplified for use of the device in a wide range and variety of applications as a fastener of general utility for securing two or more superposed parts B, C, having aligned holes defining a single work opening 2 in which the shank elements or hooks 20 are secured in the general manner described. In this regard, the sides or ends of the base 12 of the clip 10a may terminate in the plane thereof, as shown, or be provided with slightly rounded bearing surfaces which permit the desired securing action without damaging or marring the finish of part B immediately adjacent the head or base 12 of the fastener.

Fig. 7 shows a cable clip type of fastener 10b in accordance with the invention in which the securing elements are also substantially identical in construction and application to that described with reference to Figs. 1–5, inclusive, but in which the head or base 12 of the clip is provided with an extension in the form of a return bent resilient spring arm 26 or equivalent article clamping portion for retaining a cable, tube, rod or other object 28 in mounted position on the similar supporting panel A, or the like.

Figs. 8–12, inclusive, disclose a further embodiment of the invention wherein the sheet metal clip or fastener of Figs. 1–5, inclusive, is provided as a combined securing and sealing device 10' in which the arms 14 of the clip including the hooks or shank elements 20 are embedded in a thermoplastic plug 30, made of soft pliable plastic or rubber, or the like, which is receivable in the work opening 1 together with the shank elements 20 and serves to close said work opening 1 against the passage of water, dust and foreign matter in conjunction with said shank elements 20 secured in said work opening as described with reference to Figs. 1–5, inclusive.

This arrangement in which the fastener is provided with such a sealing plug 30, or the like, is important in many instances wherein the work opening or attaching hole in a part is exposed on the outer side of the installation, whereupon there is a tendency for water, dust, and other foreign matter to pass through the attaching opening into the interior of the assembly. In automobile installations, for example, this is highly objectionable inasmuch as the entrance of such water, dust and other foreign matter into the interior of the vehicle body results in damage to the upholstery, trim material, etc.

The plastic plug 30 is provided in a cross section adapted to fit snugly in the round, rectangular or other contour of the work opening in the supporting part A. In the present example, as shown in Fig. 9, the plug 30 is provided as a simple cylindrical plastic body or stud that surrounds the hook elements 20 and portions of the tabs 16 and defines a solid plug which substantially closes the work opening 1 when the clip 10' is initially applied in position to be secured in said work opening as illustrated in Fig. 10.

In this relation, the tabs 16 have the free ends thereof projecting from the outer side of the assembly and thus are readily accessible for quick and easy actuation by a suitable tool, such as a pair of pliers, as described with reference to Figs. 1–5, inclusive, to compress said tabs 16 inwardly toward each other from their initial diverging relation, Fig. 10, to substantially parallel relation as shown in Fig. 11. Such inward movement of the tabs 16 causes the arms 14, including the shank elements or hooks 20, to pivot about their bendable connections 18 in a manner whereby said hooks 20 are forced outwardly to break through the surrounding material of the plastic plug 30 and overlap the adjacent edges of the work opening 1 with the free ends of said hooks 20 defining pronounced shoulders or abutments directed toward the underside of the panel A and positively engaging material portions of said panel A adjacent the work opening 1 to positively lock the clip or fastener in secured position in said work opening 1.

As the hooks 20 are thus expanded into locking engagement in the work opening 1, the adjacent outer portions of the plastic plug 30 are also expanded into a tight and rigid engagement with the wall of said work opening 1 in a manner which adds to and reinforces the strength and rigidity of the clip in secured position and completely closes said work opening against the passage of water, dust and foreign matter. The clip or fastener 10' as thus secured in the work opening, otherwise, has the same function, purpose and use of that previously described for mounting a molding M on the supporting part A as shown in Fig. 12.

Figs. 13 and 14 show another form of the invention in which the clip or fastener 40 is provided in a construction generally similar to those previously described to comprise a base 42 and flanges 44 on the ends thereof for engaging the inturned flanges 46 on the similar molding M as shown in Fig. 14. The movable arms 48, however, are provided by lateral wings or extensions at the sides of the base 42 which define the tabs 50 and the hooks or shank elements 52 stamped from said tabs and adjacent portions of said base 42.

The arrangement, accordingly, is such that each of the movable arms 48 comprises a tab 50 having a free end and bendably connected to the fastener base along the bend line 54 and carrying a tongue 52 having a free end extending in the opposite direction from the free end of said tab 50. When the arms 48 are bent about the bend lines 54, as shown in Fig. 13, the free ends of said tabs 50 project outwardly from the outer or upper surface of the fastener base 42 while the free ends of the tongues 52 project downwardly from the inner or undersurface of said base 42. The tongues 52 carried by the tabs 50 preferably are curved inwardly and then outwardly to provide a pair of cooperating shank elements in the form of outwardly directed hooks, or the like, projecting from the underside of the fastener base and adapted to be readily received in the work opening 3, Fig. 14, in the form of an elongated slot or a pair of spaced holes in the panel D or other supporting part.

The clip or fastener 40, as thus initially applied, has the base 42 thereof seated on the supporting panel D with the shank elements or hooks 52 received in said work opening 3 and having their free ends projecting beyond the underside of said panel D. The tabs 50 have the free ends thereof projecting from the outer side of the assembly and thus are readily accessible for quick and easy actuation by a suitable tool, such as a pair of pliers, to compress said tabs 50 inwardly toward each other. The arms 48 are thus caused to pivot about their bendable connections 54 to the fastener base 42 in a manner whereby said hooks 52 are forced outwardly to overlap the adjacent edges of the work opening 3 with the free ends of said hooks 52 defining pronounced shoulders or abutments directed toward the underside of the panel D and positively engaging material portions of said panel D adjacent the work opening 3 to positively lock the clip or fastener 40 in secured position.

In mounting the molding M, Fig. 14, on the panel D, as many clips or fasteners 40 as are necessary are similarly secured in work openings 3 prepared in said panel D in aligned relation along the path in which the molding M extends in the completed assembly. The molding M is positioned over the clips 40 with the inturned flanges 46 thereof in engagement with the upper surfaces of the flanges 44 on the clips. When downward pressure is exerted on the top of the molding M, the edges of the inturned flanges 46 on said molding M are sprung into attached position on the flanges 44 on the clips as shown in Fig. 14 to provide the completed mounting of said molding M on the panel or other supporting part D, substantially as described with reference to Figs. 1–5, inclusive.

Fig. 15 shows a further embodiment of the invention in the form of a clip or fastener 60 embodying a combination of the shanks or securing elements of the clips disclosed in the devices of Figs. 1–5, inclusive, and Figs. 13, 14. This clip 60 comprises a similar base 62 having its mid portion provided with the securing elements described with reference to Figs. 1–5, inclusive, including the movable arms 14 connected to said base 62 on bend lines 18 and defining tabs 16 projecting from the outer or upper surface of said base 62, and carrying hooks or securing elements 20 projecting from the lower or inner surface of said base 62.

The sides of said base 62 include lateral wings or extensions 64 similar to the wings in the device of Fig. 13 with the same being bent and formed in the same general manner to define the similar tabs 50 projecting from the upper or outer surface of the base 62 and carrying the hooks or securing elements 52 projecting from the lower surface thereof.

The hooks or shank elements 20 and 52 all project from the inner or undersurface of the base 62 in position to be received in correspondingly spaced individual holes or work openings in a panel or other supporting part where said hooks 20, 52, are adapted to be moved outwardly responsive to inward movement of their respective tabs 16 and 50 to assume a positively locked relation in said work openings or holes, whereupon the associated molding is attached to the flanges 66 on the clip as described with reference to Figs. 1-5, inclusive, and Figs. 13 and 14.

While the invention has been described in detail with specific examples, such examples are intended as illustrations only inasmuch as the invention fully contemplates various modifications which may be provided without departing from the spirit and scope of the invention.

What is claimed is:

1. A one-piece malleable-like clip comprising a sheet metal body providing a generally planar base and a pair of spaced movable arms formed from partially severed portions of said base, said arms being integrally hinged to said base intermediate the ends of said arms and substantially in the plane of said base, said arms defining a pair of tabs generally facing each other and projecting from one surface of said base and a pair of shank elements projecting from the opposite surface of said base, each of said tabs being connected to a respective one of said shank elements substantially in the plane of said base, said shank elements being simultaneously movable in predetermined directions responsive to simultaneous movement of said tabs elements to generally permanently deformed positions and in directions opposite to the movement of the respective of said shank elements to secure the clip to a supporting part.

2. A one piece malleable-like clip comprising a sheet metal body providing a generally planar base and a pair of spaced movable arms formed from partially severed portions of said base, said arms being integrally connected to said base intermediate the ends of said arms and substantially in the plane of said base, said arms defining a pair of tab elements generally facing each other and projecting from one surface of said base and carrying integral shank elements projecting from the opposite surface of said base, each of said tab elements being connected to the respective one of said shank elements substantially in the plane of said base, each of said first mentioned elements comprising a central portion which is spaced from said base and which integrally merges with the respective shank element and lateral portions which are integrally hinged to said base, said shank elements being of generally outwardly bent configuration and being simultaneously movable in outward directions responsive to simultaneous movement of said tabs to generally permanently deformed positions and in inward directions with respect to one another, to secure such shank elements to a supporting part.

3. A clip comprising a malleable-like sheet metal body providing a generally planar base having partially severed portions defining a pair of spaced movable arms, said arms comprising a pair of tabs projecting from one surface of said base and being hinged to said base generally along the plane of the latter, outwardly directed shank portions projecting from the other surface of said base and being carried by said tabs, each of said shank portions merging with the respective one of said tabs in slightly spaced relation to said plane of said base, said shank portions being disposed generally inwardly of said hinged connections of said tabs to said base, and a comparatively soft plastic plug molded onto said shank portions with the latter being substantially completely embedded in the said plug, said clip being adapted to be received over a work opening in a supporting part with said plug and embedded shank portions projecting through said work opening, said shank portions being movable outwardly with respect to one another responsive to simultaneous inward movement of said tabs, whereby the free ends of said shank portions break through the defining surfaces of said plug to engage said supporting part remote from said work opening and cause portions of said plug to flow into engaged sealing relation with the periphery of said work opening, to seal the latter against the passage of foreign matter in the secured position of said shank portions.

4. A clip comprising a malleable-like sheet metal body providing a generally planar base having partially severed portions within the periphery thereof and portions projecting laterally from opposite sides of said base, each of said portions defining a movable arm integrally connected to said base intermediate the ends of said arms and substantially in the plane of said base, each of said arms comprising a tab projecting from one surface of said base and being integrally hinged thereto and an outwardly bent shank portion projecting from the opposite surface of said base and being carried by said tab, said shank portion merging with said tab substantially in the plane of said base, each shank portion being movable outwardly responsive to inward movement of its respective tab to a generally permanently deformed position and about its hinged connection to said base, to secure each of said shank portions to a supporting part.

5. A one piece malleable-like clip comprising a sheet metal body providing a generally planar base and at least one pair of spaced movable arms formed from partially severed portions of said base, said arms being integrally hinged to said base intermediate the ends of said arms and substantially in the plane of said base, said arms defining a pair of tabs generally facing each other and projecting from one surface of said base and a pair of shank elements carried by said tabs and projecting from the opposite surface of said base, each of said tabs being connected to the respective shank element substantially in the plane of said base, each of said shank elements being of bent configuration initially extending inwardly away from its respective tab and then being bent outwardly with respect to the inwardly extending portion of the respective shank element, said shank elements being disposed inwardly of said hinged connections of said arms to said base, said shank elements being movable simultaneously in outward directions responsive to simultaneous movement of said tabs to generally permanently deformed positions and in directions opposite to the movement of the respective of said shank elements, to secure said shank elements to a supporting part, and means on said base for attaching a cooperating object to the clip.

References Cited in the file of this patent

UNITED STATES PATENTS

| | | |
|---|---|---|
| 2,080,769 | Fitts | May 18, 1937 |
| 2,166,916 | Lombard | July 18, 1939 |
| 2,460,722 | Waara | Feb. 1, 1949 |
| 2,476,207 | Brown | July 12, 1949 |
| 2,560,519 | Bedford | July 10, 1951 |
| 2,618,193 | Peckham | Nov. 18, 1952 |
| 2,643,433 | Scott | June 30, 1953 |
| 2,670,512 | Flora | Mar. 2, 1954 |
| 2,689,992 | Flora | Sept. 28, 1954 |
| 2,703,428 | Redmond | Mar. 8, 1955 |
| 2,748,645 | Peckham et al. | June 5, 1956 |